United States Patent
Jones et al.

(10) Patent No.: US 7,524,421 B2
(45) Date of Patent: Apr. 28, 2009

(54) METHOD OF FORMING ALGINATE PARTICLES IN AN AQUEOUS SOLUTION CONTAINING METAL IONS

(75) Inventors: Robert Gavin Jones, Huntsville, TX (US); Rachelle Smith, Midway, TX (US); Gordon Alf Plishker, The Woodlands, TX (US)

(73) Assignee: Sam Houston State University, Huntsville, TX (US)

( * ) Notice: Subject to any disclaimer, the term of this patent is extended or adjusted under 35 U.S.C. 154(b) by 0 days.

(21) Appl. No.: 11/368,320

(22) Filed: Mar. 3, 2006

(65) Prior Publication Data

US 2007/0205157 A1    Sep. 6, 2007

(51) Int. Cl.
*C02F 3/00*    (2006.01)

(52) U.S. Cl. .................. 210/679; 210/683; 210/688

(58) Field of Classification Search .................. 710/679, 710/683, 688
See application file for complete search history.

(56) References Cited

U.S. PATENT DOCUMENTS

| | | |
|---|---|---|
| 4,009,098 A | 2/1977 | Jeris |
| 4,085,041 A | 4/1978 | Fullerton et al. |
| 4,994,391 A | 2/1991 | Hoffmann |
| 5,217,616 A | 6/1993 | Sanyal et al. |
| 5,599,451 A | 2/1997 | Guiot |
| 5,756,304 A | 5/1998 | Jovanovich |
| 5,928,514 A | 7/1999 | Gothreaux |
| 5,976,377 A | 11/1999 | Hyfantis, Jr. et al. |
| 6,039,875 A | 3/2000 | Christiansen et al. |
| 6,245,237 B1 | 6/2001 | Blough et al. |
| 6,335,191 B1 | 1/2002 | Kiplinger et al. |
| 6,342,159 B1 | 1/2002 | Caplan et al. |
| 6,461,500 B1 | 10/2002 | Hoage et al. |
| 6,719,902 B1 | 4/2004 | Alvarez et al. |
| 6,758,633 B2 | 7/2004 | Yen |
| 6,790,355 B2 | 9/2004 | Shaffer et al. |
| 6,790,365 B2 * | 9/2004 | Hirai et al. .................. 210/690 |
| 6,841,515 B2 | 1/2005 | Burnham |
| 6,849,445 B2 | 2/2005 | Fayolle et al. |
| 6,861,245 B1 | 3/2005 | Smit |
| 6,921,477 B2 | 7/2005 | Wilhelm |
| 6,989,102 B1 * | 1/2006 | Park et al. .................. 210/679 |
| 7,022,234 B2 | 4/2006 | Shaffer et al. |
| 7,175,766 B2 | 2/2007 | Kim et al. |

(Continued)

FOREIGN PATENT DOCUMENTS

EP        0745562        12/1996

(Continued)

OTHER PUBLICATIONS

Ibanez et al. "Hydrometallugry", 2002, vol. 64, pp. 89-99.

(Continued)

*Primary Examiner*—Chester T Barry
(74) *Attorney, Agent, or Firm*—Meyertons, Hood, Kivlin, Kowert & Goetzel, P.C.; Eric B. Meyertons (57) ABSTRACT

In some embodiments, a system may reduce metal compounds from water. A system may include alginate particles in a housing. The alginate particles may be formed by directly adding alginate granules to an aqueous solution comprising metal ions, such as calcium ions.

20 Claims, 10 Drawing Sheets

U.S. PATENT DOCUMENTS

| | | |
|---|---|---|
| 7,189,281 B2 | 3/2007 | Kim |
| 2001/0011643 A1 | 8/2001 | Newton et al. |
| 2004/0175407 A1 | 9/2004 | McDaniel |

FOREIGN PATENT DOCUMENTS

| | | |
|---|---|---|
| WO | 2004052795 | 6/2004 |

OTHER PUBLICATIONS

Co-Pending U.S. Appl. No. 11/368,282 entitled, "Mobile Bioremediation Systems and Methods" to Jones et al., available in Pair.

Co-Pending U.S. Appl. No. 11/368,324 entitled, "Systems and Methods for Reducing Water Contamination" to Plishker et al., available in Pair.

Co-Pending U.S. Appl. No. 11/368,330 entitled, "Systems and Methods for Preserving Bacteria in a Starvation Phase" to Jones et al., available in Pair.

Co-Pending U.S. Appl. No. 11/368,319 entitled, "Bacteria-Alginate Bead Systems and Methods" to Jones et al., available in Pair.

Co-Pending U.S. Appl. No. 11/368,762 entitled, "Systems and Methods of Creating a Biofilm for the Reduction of Water Contamination" to Jones et al., available in Pair.

Roheim, John R., "Low Cost Automated on Site Systems for Growing and Dispensing Vegetative Bacteria," available on the ECOBionics website at http://www.wateronline.com/ecommcenters/ecobionics.html. Published Jan. 20, 2005.

"Apex Innovation Test Development of Vacuum Bubble® Aerator for Remediation of Petroleum Contaminated Sites," available on the Advanced Aeration, Inc. website at http://www.advancedaeration.com. Published 2004.

"Aeration of Animal Wastes Newman Environmental Solutions, Inc. (NESi) Greenville, N.C.," available on the Advanced Aeration, Inc. website at http://www/advancedaeration.com. Published 1998.

Kaprelyants, Arseny S. and Douglas B. Kell, "Dormancy in Stationary-Phase Cultures of Micrococcus luteus: Flow Cytometric Analysis of Starvation and Resuscitation." Applied and Environmental Microbiology, Oct. 1993, vol. 59, No. 10, pp. 3187-3196.

Uemoto, Hiroaki and Hiroshi Saiki, "Distribution of *Nitrosomonas europaea* and *Paracoccus denitrificans* Immobilized in Tubular Polymeric Gel for Nitrogen Removal" Applied and Environmental Microbiology, Feb. 2000, pp. 816-819, vol. 66, No. 2.

Ogden, K. L. et al., "Investigating the use of biosorption to treat copper CMP wastewater," www.micromagazine.com, Jul./Aug. 2001.

Lewandowski, Z. et al., "Heavy Metals Removal from Contaminated Water Solutions," available from the HSRC The Great Plains/Rocky Mountain Hazardous Substance Research Center website at http://www.engg.ksu.edu/HSRC/heavy.html. Jan. 25, 2005.

Jodra, Y. and F. Mijangos. "Ion Exchange Selectivies of calcium alginate gels for heavy metals," Water Sci. Technol., vol. 43, No. 2, 2001, pp. 237-244, available on PubMed at http://www.ncbi.nlm.nih.gov/entrez/query.fcgi?cmd=Retrieve&db=pubmed&dopt=Abstract&list_uids=11380185&query_hl=1.

"Bioremediation of Contaminated Soil, Groundwater, and Wastewater" from the Environmental Biotechnology Laboratory website at http://www.nies.go.jp/kenko/biotech/research/biore Published 2002.

Hoage et al. "Innovation Aeration Retrofit of Existing Failed Septic Systems around Lake Livingston, Texas." Advanced Aeration, Inc. website. Published 2004.

Lowry "Comparison of Four Treatment Methods for the Removal of Lipids and Food Waste in a Grease Trap Environment." Advanced Aeration, Inc. website. Published 2004.

Hoage et al. "Aeration Pretreatment for Commercial Resteraunts." Advanced Aeration, Inc. website. Published 2006.

PCT Application No. PCT/US2007/063317, Search Report, Mailed Jan. 18, 2008.

PCT Application No. PCT/US2007/063317, Written Opinion, Mailed Jan. 18, 2008.

PCT Application No. PCT/US2007/063317, IPRP, Mailed Sep. 9, 2008.

Office Action issued on Jan. 14, 2008 for U.S. Appl. No. 11/368,282.

Office Action issued on Oct. 15, 2008 for U.S. Appl. No. 11/367,762.

\* cited by examiner

METHOD OF FORMING ALGINATE PARTICLES IN AN AQUEOUS SOLUTION CONTAINING METAL IONS

STATEMENT REGARDING FEDERALLY SPONSORED RESEARCH OR DEVELOPMENT

This invention was made with Government support under Contract #F41624-02-Z-9000 awarded by the Air Force AFIOH TRIES Collaborative Water/Wastewater Treatment Technology Project. The Government has certain rights to this invention.

BACKGROUND

1. Field of the Invention

The present invention relates to systems and methods for treating a fluid. More particularly, the invention relates to the removal of metal compounds from fluids, such as wastewater.

2. Brief Description of the Related Art

Heavy metal pollution from industrial and municipal wastewater is often removed using chemical precipitation, carbon adsorption, ion exchange, and reverse osmosis. Currently, chemical precipitation is most commonly used to remove heavy metal pollution from wastewater. Bacteria in biofilms, particles, and/or immobilized on various surfaces are often used to remove heavy metals from wastewater. However, bacteria systems are living systems that need to be fed and managed. Bacteria also may not be capable of surviving in the acidic solutions of many metal contaminants. In addition, since bacteria absorb heavy metals, the heavy metal concentration in the bacteria will eventually reach a toxic level to the bacteria.

In other systems, heavy metal pollutants are precipitated out of the wastewater and filtered out of the wastewater solution. Precipitating out metal ions requires continuous use of various solvents, many of which are toxic. In addition, precipitates may foul wastewater treatment systems.

There currently exists a need for a simple, low maintenance, reusable system for the removal of metal contaminants.

SUMMARY

In various embodiments, a system for the removal of metal compounds from water may include alginate particles in a housing. Alginate particles may be formed by directly adding alginate granules, such as sodium alginate, to an aqueous solution comprising metal ions, such as calcium chloride. The aqueous solution may be agitated and alginate particles may form. The alginate particles may be dried and/or stored for later use.

The alginate particles may be positioned in a housing that also includes one or more filters and one or more fillers. A feed stream may be processed by the alginate particles in the housing and metals from the feed stream may be removed.

After the alginate particles have processed one or more feed streams for a period of time, it may be desirable to regenerate the alginate particles. In some embodiments, a regenerative solution may pass through the housing and available ions in the regenerative solution may be exchanged for metal ions in the alginate from the feed solution. The system may use cocurrent and/or countercurrent regeneration for the alginate particles.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

Herein we describe a system and method for the removal of metal compounds from a fluid, such as heavy metal compounds in water. In an embodiment, the system may process drinking water, industrial waste, municipal wastewater, and/or water in septic or sewer systems. The system may process wastewater using alginate beads to reduce the amount of contaminants in the wastewater.

Unless defined otherwise, all technical and scientific terms used herein have the same meaning as commonly understood by one of ordinary skill in the art. In the context of this application, the following terms are defined as:

"Alginate" refers to any compound that includes a cation and alginate.

A "contaminant" refers to any unwanted substance or compound.

"Cocurrent regeneration" refers to when feed streams and regenerative solution flow through a housing in the same direction.

"Countercurrent regeneration" refers to when feed streams and regenerative solution flow through a housing in opposite directions.

A "heavy metal" refers to any metal with an atomic weight greater than 26.

A "filter" refers to any material capable of mechanically separating material larger than predetermined size from other material.

"Material" refers to any solid, liquid, gas, or combination thereof.

A "metal" refers to any element of the Periodic Table capable of forming a cation by loss of one or more electrons.

A "metal contaminant" refers to a contaminant that contains a metal.

A "metal organic" refers to a compound that includes at least one metal and at least one organic compound.

An "organic compound" refers to any compound containing carbon.

"Regenerate" refers contacting a material capable of ion exchange with an excess amount of ions to be exchanged with ions in the material.

A "regenerative solution" refers to a solution capable of regenerating a material. The regenerative solution may be acidic, neutral, or basic. A regenerative solution may have cations and/or anions available for ion exchange with a material.

"Removal of metal compound" refers to reducing an amount and/or concentration of metal compounds in a fluid. Reduction of metal compounds in water may occur by ion exchange, absorption, adsorption, physical entrapment, coupling to a surface of a particle, and/or precipitation.

A "stream" refers to flow of gas, liquid, solids, and/or combinations there of.

"Wastewater" refers to a fluid comprising one or more contaminants.

Figure 1A:
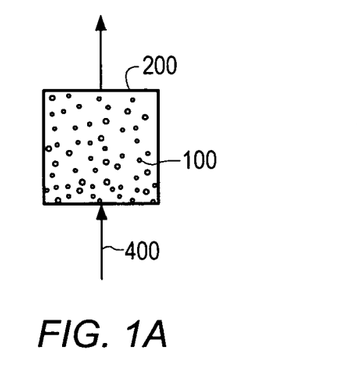
FIGS. 1A-B depict embodiments of systems that include alginate particles in housings.
Figure 1B:
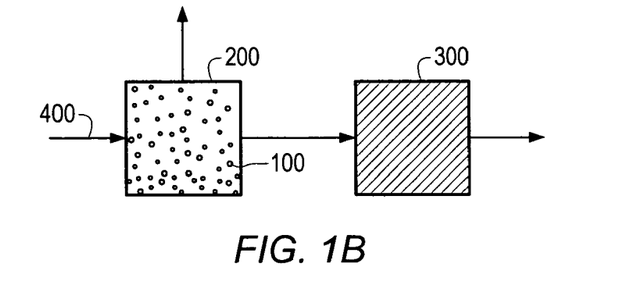

In some embodiments, a system for the removal of metal compounds from water may include alginate particles 100 in a housing 200, as depicted in FIGS. 1A-1B. One or more filters 300 may be positioned in and/or coupled to the housing 200. A feed stream 400, such as wastewater, may flow through the housing 200 and contact alginate particles 100. The alginate particles 100 may remove at least a portion of the metal compounds in the feed stream 400.

In some embodiments, alginate particles may remove metal compounds, such as heavy metal compounds and/or metal organic compounds, from a fluid. Alginate particles may remove metals from a fluid by ion exchange, absorption, adsorption, physical entrapment, coupling to a surface of a particle, and/or precipitation. In certain embodiments, ions in alginate particles may exchange with metal ions in a fluid. In some embodiments, one or more elements or combination of elements in the alginate particle (e.g., sodium, calcium, hydrogen, hydroxide) may be replaced with metals from a feed stream that contact the alginate particles. For example, calcium in the alginate particle may be replaced by iron from the feed stream.

Alginate particles may be substantially spherical, substantially oval, substantially cubic, and/or irregular. Alginate particles may have a width less than 1 mm. Alginate particles may have a width less than approximately 150 μm. Alginate particles, in certain embodiments, may have a width from approximately 1 μm to approximately 5 μm.

In some embodiments, alginate particles may be firm and/or not gelatinous. Alginate particles may resist substantial deformation. Alginate particles may not adhere to each other and/or other materials. Alginate particles may not polymerize in the presence of water and/or aqueous solutions.

Alginate particles may be porous. Pores in alginate beads may retain compounds and/or ions. Pores, in an embodiment, may have attractive properties. For example, some metal ions may be attracted and/or couple to a surface of a pore. In an embodiment, ions proximate and/or in pores in alginate beads may exchange and/or chelate with metal ions.

In certain embodiments, alginate particles may not be substantially damaged by changes in pH. Alginate particles may not be substantially damaged by solutions with a pH below 9. In an embodiment, alginate particles may not be substantially damaged by nonbasic solutions.

Figure 2:
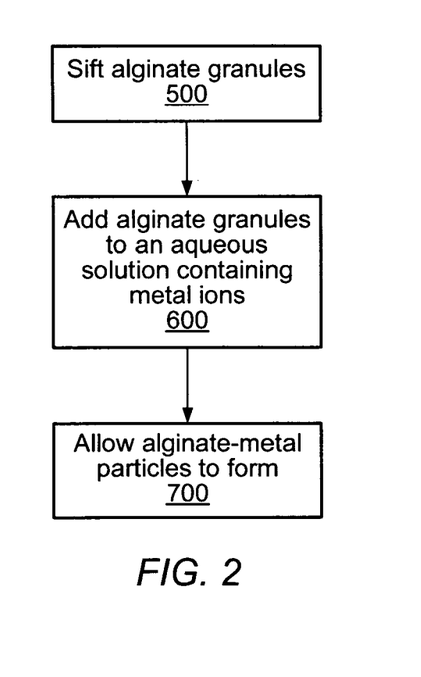
FIG. 2 depicts an embodiment of a method of forming alginate particles.

In some embodiments, alginate particles for a system for the removal of heavy metal compounds in water may be prepared from alginate granules, see FIG. 2. Alginate granules may be added to an aqueous solution that includes metal ions to form alginate particles.

Alginate granules may include sodium alginate, calcium alginate, barium alginate, zinc alginate, copper alginate, and/or mixtures thereof. Alginate granules may be cold-soluble and/or cold-setting, which may reduce operating costs in the formation of alginate particles. In an embodiment, alginate granules may form a viscous solution when placed in water; however, if the aqueous solution includes metal ions, alginate particles may form when the alginate granules are added.

In an embodiment, alginate granules are autoclaved at a temperature from approximately 115° C. to approximately 125° C. Since alginate granules may not be sterile, autoclaving may sterilize the alginate. Autoclaving the alginate may also inhibit growth of bacteria, or other material from the alginate granules, on the alginate beads.

In some embodiments, alginate granules may aggregate together due to moisture in the environment. In an embodiment, alginate granules may be sifted to remove large granules and/or break-up larger granules 500, see FIG. 2. In some embodiments, the size of the alginate particles may be controlled by sifting the alginate granules. Sifting, in some embodiments, may include passing the alginate granules through sieves. Alginate granules may be sifted through more than one sieve of more than one pore size. For example, alginate granules may be sifted through a #25 ASTM sieve and then through a #20 ASTM sieve.

Sifting, in certain embodiments, may produce approximately uniform alginate granules and thus alginate particles. Sieves with pore diameters of approximately 50 μm to approximately 150 μm may be used. In an embodiment, alginate granules may be first sifted through a first sieve at a first pore diameter. The material that does not pass through the sieve may then be sifted through a second sieve with a second pore diameter that is larger than the first pore diameter of the first sieve. The material that passes through the second sieve may be collected and used to produce alginate particles.

In another embodiment, alginate granules may be sifted through a first sieve with a first pore diameter.

Then the material that passes through the sieve may be passed through a second sieve with a second pore diameter that is less than the first pore diameter of the first sieve. The material that passes through the second sieve may then be used to form alginate particles. For example, sodium alginate may be sifted through sieves with pore diameters of 710 μm and 850 μm.

To form the alginate particles, alginate granules may be added directly to an aqueous solution that contains metal ions 600. The aqueous solution containing alginate granules and metal ions may be agitated and the alginate particles may form 700. In an embodiment, the aqueous solution containing metal ions may be agitated during introduction of the alginate granules. The aqueous solution, in some embodiments, may include sodium, calcium, zinc, barium, copper, and/or combinations thereof. It may be advantageous to add alginate granules to an aqueous solution that includes calcium ions because calcium is inexpensive and/or not a contaminant at certain levels. For example, calcium may not be a contaminant, according to regulatory agencies, at certain levels that are higher than allowable levels for lead and other heavy metals. An aqueous solution that includes calcium ions may be formed inexpensively, in an embodiment, from limestone, gypsum, calcium chloride, calcium sulfate, dicalcium phosphate, and/or any combination thereof.

In some embodiments, the alginate particles may be dried and/or stored for later use. Unlike alginate particles described by Ibanez et al. in "Potential of protonated alginate beads for heavy metals uptake," *Hydrometallurgy*, 64, (2002), pp. 89-99, which is incorporated by reference, in an embodiment, alginate particles may not be treated with an acid. Ibanez et al. describe acid washing alginate beads to form protonated alginate beads that can remove heavy metals from water better than unprotonated alginate beads. However, in some embodiments, the system may include alginate particles that perform better when the alginate particles are not washed with an acid during formation to protonate the beads.

In some embodiments, a system for removing metals from water may include a housing. A housing may substantially retain alginate particles within the housing. A housing may be designed so that alginate particles are removable from the housing.

A housing may include a metal, plastic, and/or combination thereof. A cross-sectional area of a housing may be a substantially square, substantially rectangular, substantially circular, substantially oval, and/or irregularly shaped. The housing may be a conduit, such as a cylindrical pipe. The housing may include one or more coatings, such as waterproofing coatings, water resistant coatings, anti-corrosion coatings, and/or coatings to inhibit reaction of the housing with the feed stream, effluent, and/or alginate particles.

Figure 3A:
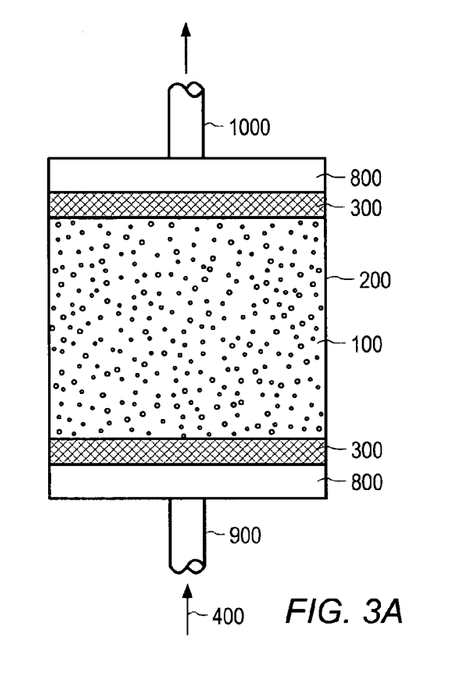
FIGS. 3A-C depict embodiments of systems that include alginate particles in housings.
Figure 3B:
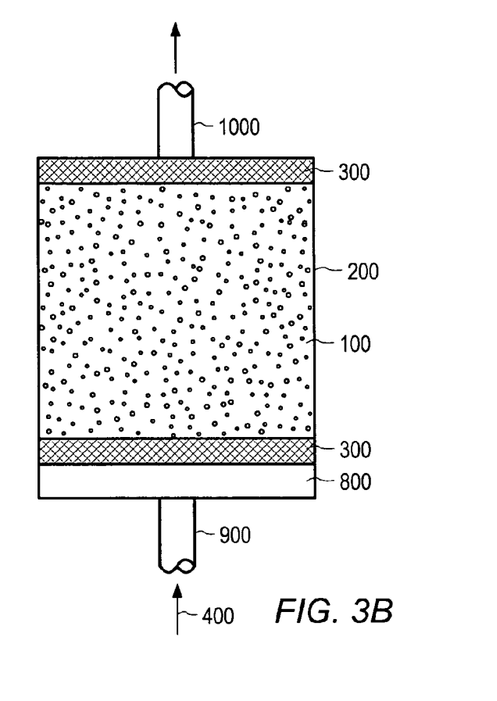

In some embodiments, a system for removing heavy metals from water may include a housing 200 that is a conduit, see FIG. 3A-B. The housing 200 may include two or more filters 300. In some embodiments, filters may include meshes, filter papers, sieves, strainers, and/or glass fibers. One or more filters may at least partially retain alginate particles in the housing.

A filter 300 may be positioned at a distance from an end of a housing 200. In an embodiment, a gap 800 may be formed between a filter 300 and an end of a housing 200. It may be advantageous to have a gap 800 in the housing 200. A feed stream 400 entering the housing may at least partially fill the gap 800 so that the feed stream may flow approximately uniformly through the alginate particles 100.

In certain embodiments, a feed stream 400 may unevenly disperse through alginate particles 100 when an inlet directly flows into the particles. For example, when an inlet 900 and an outlet 1000 are positioned proximate to the center of an end of a cylindrical housing 200, a feed stream 400 may not contact the alginate beads 100 proximate the housing and/or may only contact alginate particles proximate a center of the housing. In certain embodiments, uniform flow of a feed stream 400 through the alginate particles 100 in a housing 200 may reduce the frequency with which alginate particles need to be regenerated and/or replaced.

Figure 3C:
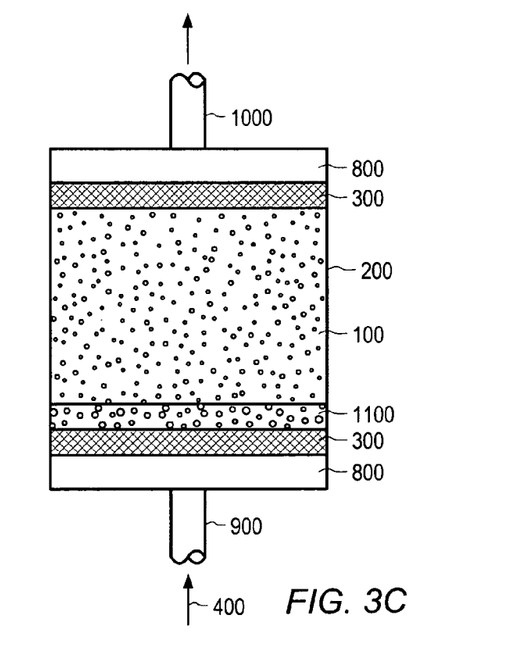

As depicted in FIG. 3C, a housing may include one or more fillers 1100. In some embodiments, filler may include quartz granules; glass beads; silica beads; sand; plastic beads; such as polystyrene beads and/or acrylic beads; and/or any mixture thereof. A feed stream 400 may flow through filler 1100 prior to flowing through the alginate particles 100. In certain embodiments, filler 1100 may be positioned between a filter 300 and the alginate particles 100 in the housing 200. Filler 1100 may replace a filter 300 in the housing 200. Filler 1100 may diffuse a fluid flowing through the housing 200. In an embodiment, filler 1100 may reduce a flow rate of fluid flowing through the filler.

In some embodiments, the system may include a controller. A controller may automatically measure an amount of metal in an effluent. A controller may compare an amount of metal in an effluent to a predetermined level and either recycle a portion of the effluent to one or more housings containing alginate particles and/or allow the effluent to flow through an exit line based on the comparison.

A controller may regenerate alginate particles based on the measured amount of metal in an effluent. The controller may automatically stop the flow of a feed stream through the housing and allow a regenerative solution to be processed by the alginate beads.

A controller may be used to measure pressures and/or pH in the system. The controller may adjust flow rates, vent gas, add a solution to adjust a pH, and/or bypass various components in the system in response to the measured pressure and/or pH.

Figure 4A:
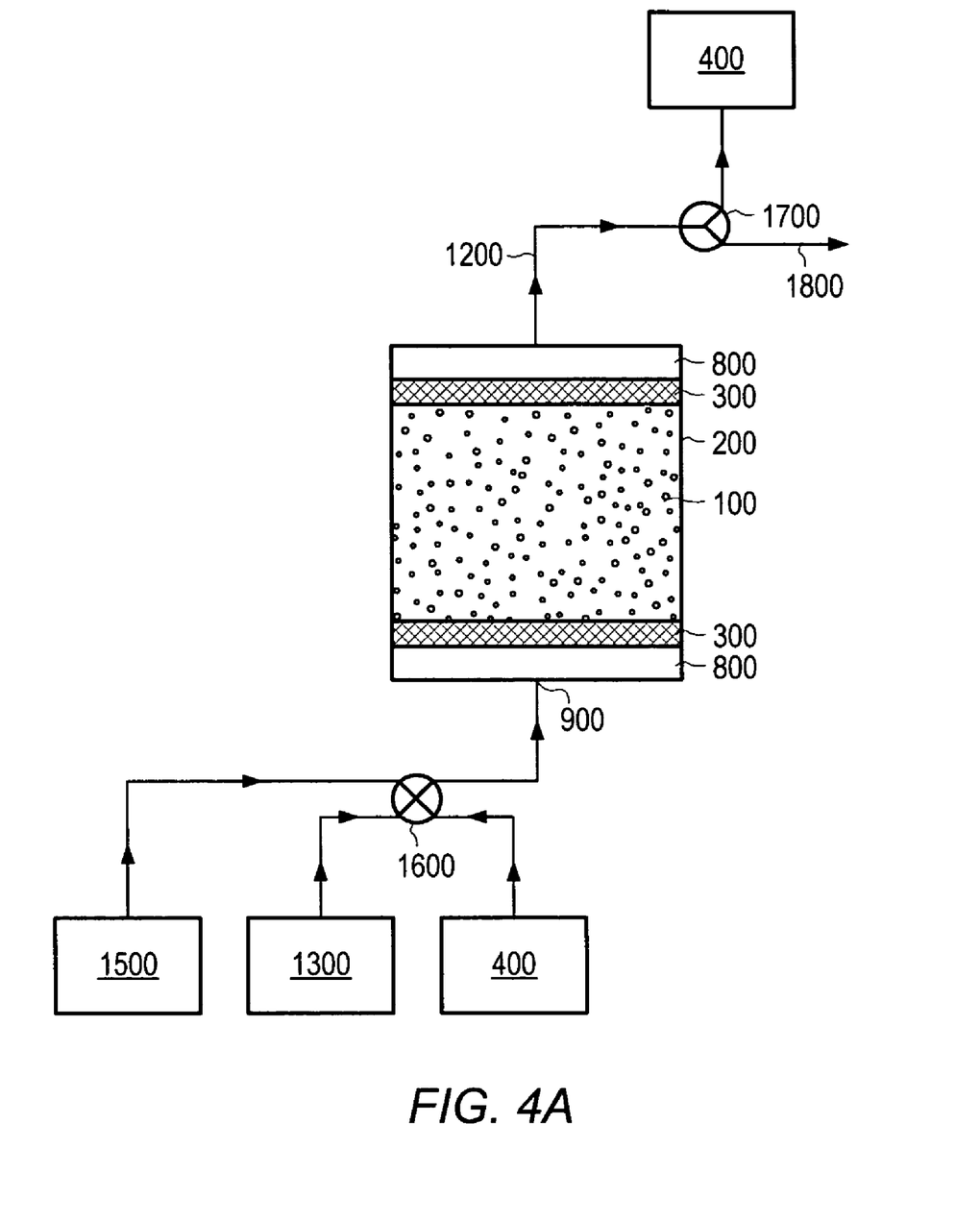
FIG. 4A depicts an embodiment of a system capable of cocurrent regeneration.
Figure 4B:
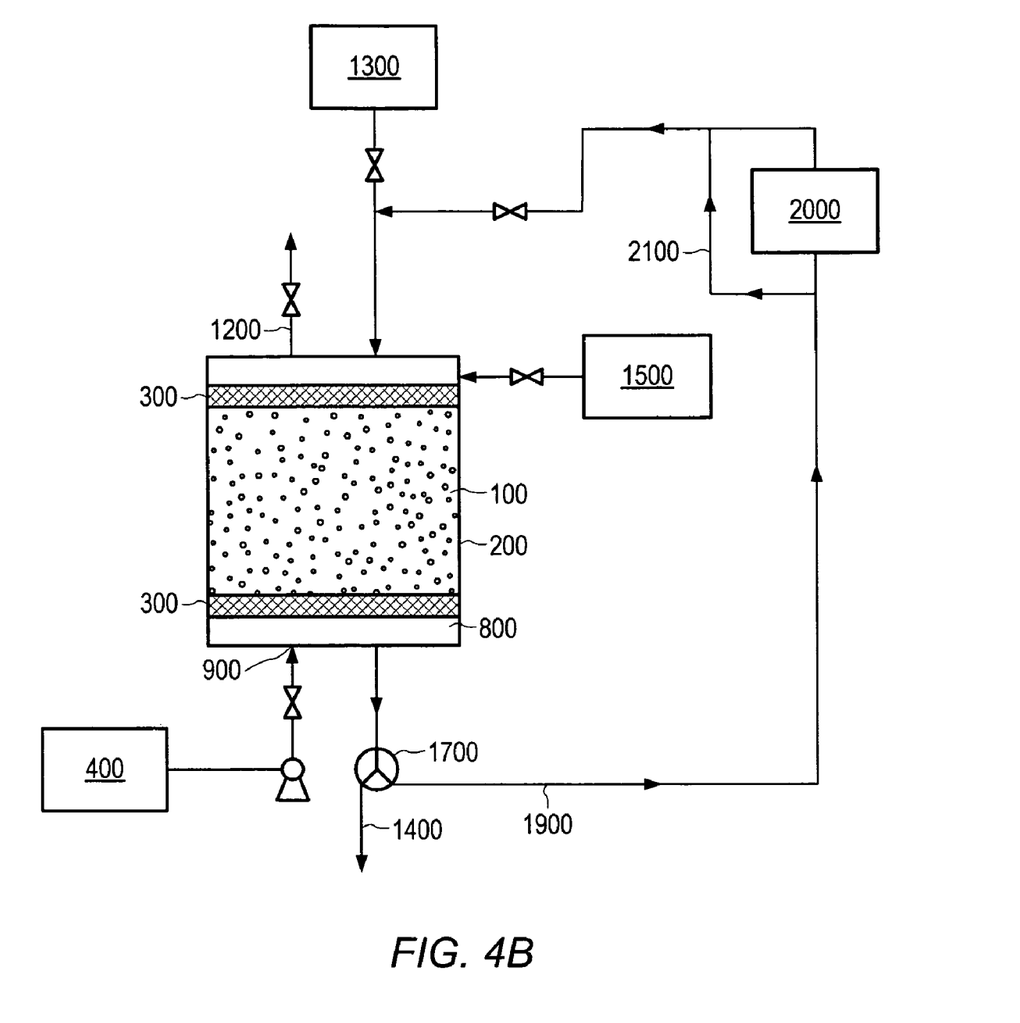
FIG. 4B depicts an embodiment of a system capable of countercurrent regeneration.

In some embodiments, a feed stream that includes one or more metal compounds may be processed by a system for the reduction of metal compounds, see FIGS. 4A-B. A feed stream 400 may flow through at least one of the inlets 900 in a housing 200. A feed stream may flow against or with gravity. In an embodiment, metals from a feed stream may be removed more efficiently when a feed stream enters a bottom of a housing and flows against gravity to contact alginate beads.

The feed stream 400 may disperse in a gap 800 in the housing 200, flow through a filter 300, and then contact alginate particles 100. Metal compounds may be removed from the feed stream 400 by contacting alginate particles 100. In an embodiment, the effluent 1200 may exit the housing 200 via one or more outlets. Unlike many current commercial ion exchangers, the pH of the feed stream containing metal ions may not need to be adjusted for the alginate particles to remove metal ions from the feed stream. It may be more efficient and cost effective to not add a solution to alter the pH of a feed stream prior to processing.

Figure 5A:
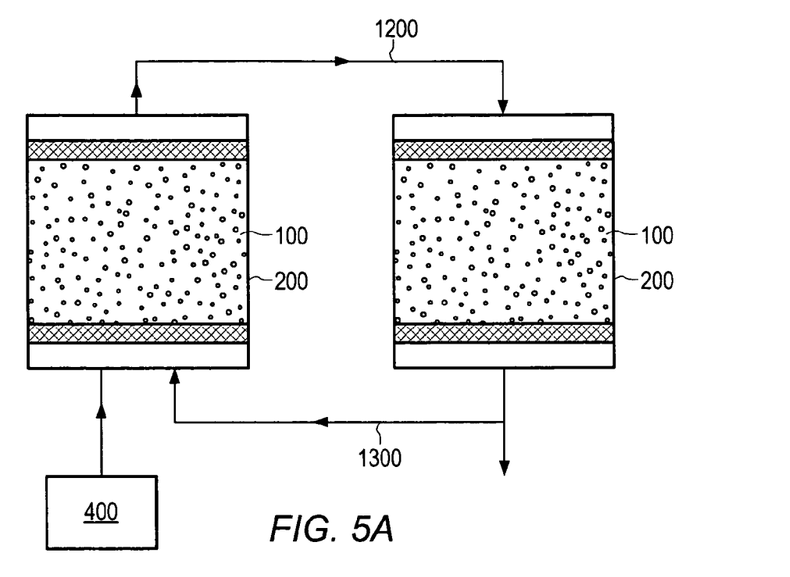
FIGS. 5A-B depict embodiments of systems in which effluent may be recycled into a housing.
Figure 5B:
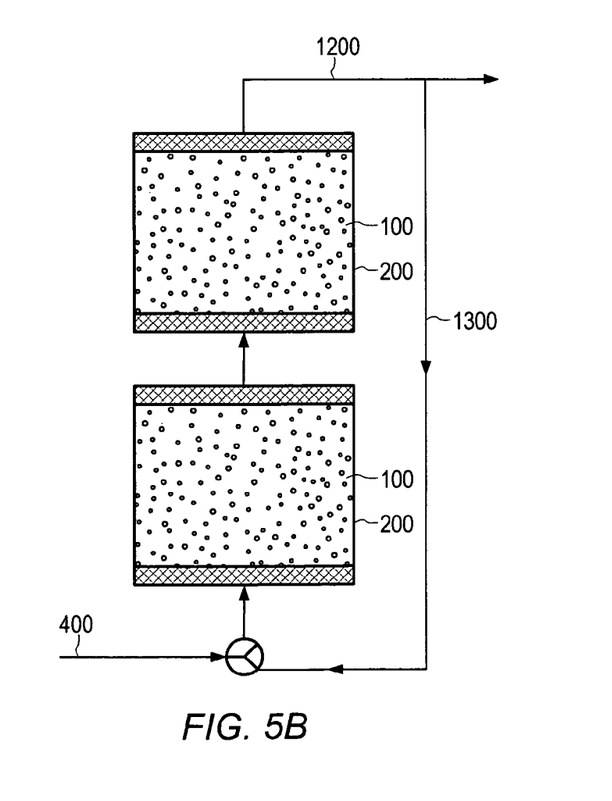

In some embodiments, more a feed stream 400 may be processed by more than one housing 200 containing alginate particles 100, as depicted in FIGS. 5A-B. Two or more housings 200 for alginate particles 100 may be connected in series and/or in parallel. In an embodiment, at least a portion of an effluent 1200 from a housing 200 containing alginate particles 100 may be recycled 1300 into the same or a different housing 200 containing alginate particles 100.

In some embodiments, after alginate particles have been used for a period of time, the alginate particles may be able to reduce less metal from a feed stream. The alginate particles may be regenerated with a regenerative solution. The regenerative solution may be acidic, basic, or neutral. In certain embodiments, the ions in the regenerative solution may exchange with ions in or on the alginate beads. The regenerative solution may wash compounds and/or ions coupled to a surface of the alginate beads. The ions in the regenerative solution may exchange with ions coupled to a surface of the alginate beads and/or ions in the alginate beads.

In some embodiments, the alginate particles may be regenerated, as shown in FIGS. 4A-B. A regenerative solution 1300 may be allowed to flow into the housing 200 to regenerate the alginate particles 100. A regenerative solution 1300 may be acidic and/or basic. In some embodiments, an acidic and a basic regenerative solution 1300 may flow through the housing 1300 to regenerate the alginate particles 100. During regeneration an excess amount of cations and/or anions may be exchanged with ions in the alginate particles 100. For example, if alginate particles are used to remove $Fe^{3+}$ ions from a solution, the alginate particles may be regenerated with an acidic solution, such as HCl and $H^+$ may replace $Fe^{3+}$ ions coupled to the alginate and $Fe(Cl)_3$ may flow out of the housing as an effluent. In an alternative embodiment, if alginate particles are used to remove $Fe^{3+}$ ions from a solution, the alginate particles may be regenerated with an basic solution, such as $Ca(OH)_2$ and $Ca^{2+}$ may replace $Fe^{3+}$ ions coupled to the alginate and $Fe(OH)_3$ may flow out of the housing as an effluent. The effluent 1200 from regeneration may be collected as waste 1400. In certain embodiments, after regeneration with an acidic and/or basic solution, water 1500 may be passed through the alginate particles 100. Water may pass through the housing in the same direction and/or opposite direction as regenerative solution. The water 1500 may substantially remove any remaining regenerative solution 1300 from the housing 200. In an embodiment, a valve 1600 may control what flows into the housing 200. A valve 1700 may also direct fluids to an exit line 1800 and/or a waste collection region 1400.

In some embodiments, at least a portion of the regenerative solution may be reused. In certain embodiments, an effluent stream containing a first portion of a regenerative solution that passes through alginate particles may only contain less than 50% of the available ions for regeneration compared to the regenerative solution fed into the housing, however an effluent stream containing a second portion of the regenerative solution that passes through the alginate beads may contain more than 50% of the available ions for regeneration compared to the regenerative solution fed into the housing. In an embodiment, a second portion of a regenerative solution may contain at least 75% of the available ions from the regenerative solution fed into the housing. It may be advantageous to reuse the portion of the effluent stream containing regenerative solution with a predetermined concentration of available ions.

In certain embodiments, during regeneration of a material capable of ion exchange, the first portion of a regenerative solution 1300 may be discarded as waste 1400, see FIG. 4B. A second portion of a regenerative solution 1300 may be recycled 1900 to the alginate particles 100. In an embodiment, the regenerative solution recycle line 1900 may include a storage container 2000. Regenerative solution 1300 may be stored in the storage container 2000 until needed and then recycled to the alginate particles 100. A regenerative solution recycle line 1900 may include a bypass 2100 line, so that regenerative solution 1300 may be directly recycled to the alginate particles 100.

Cocurrent regeneration and/or countercurrent regeneration, in some embodiments, may be used to regenerate alginate beads. FIG. 4A depicts an embodiment of a system with cocurrent regeneration, and FIG. 4B depicts an embodiment of a system with countercurrent regeneration. It may be cost efficient to use a system capable of cocurrent regeneration since a housing would only need one inlet for regenerative solution and feed. In an embodiment, a system with countercurrent may be more efficient than a system with cocurrent regeneration. Contact between the regenerative solution and alginate particles may be maximized using countercurrent regeneration. In addition, a greater percentage of alginate beads proximate a feed inlet may be regenerated using countercurrent regeneration than when using cocurrent regeneration, and so the efficiency of metal and/or metal compound removal by the regenerated alginate particles in the housing may be improved overall when compared to cocurrently regenerated alginate particles.

Figure 6:
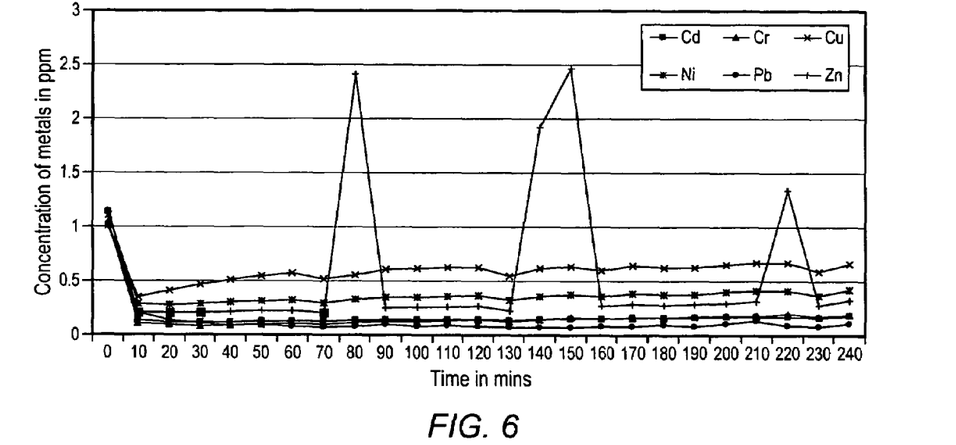
FIG. 6 depicts a representation of a graph of concentration of metal ions in an effluent from an embodiment of a system.
Figure 7:
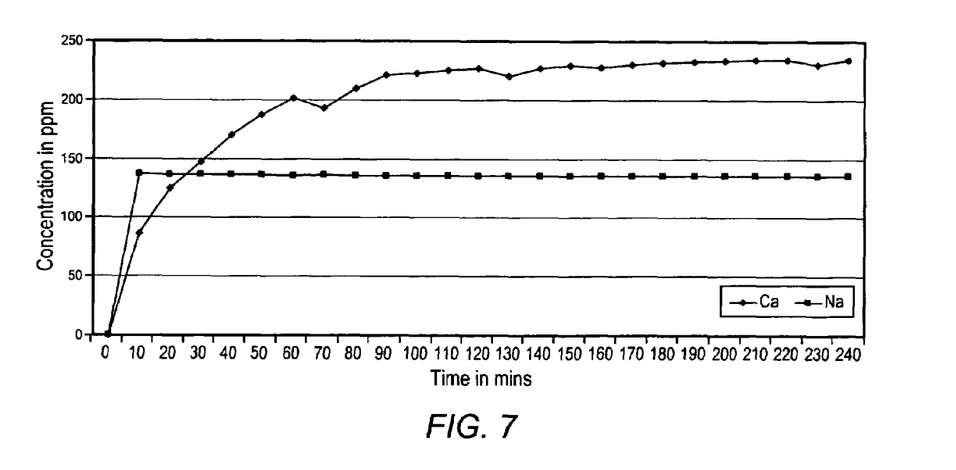
FIG. 7 depicts a representation of a graph of concentration of sodium and calcium ions in the effluent of FIG. 6.
Figure 8:
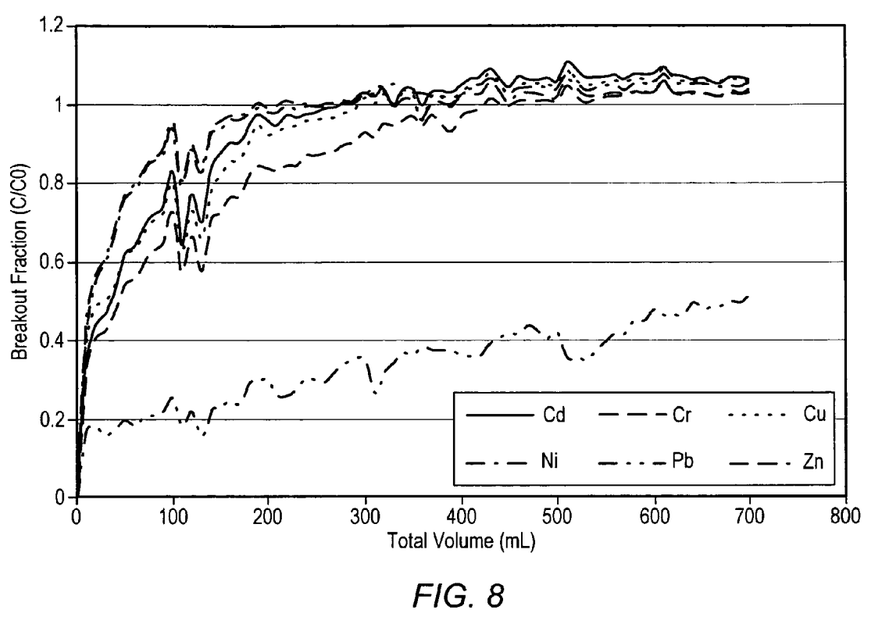
FIG. 8 depicts a representation of a breakout curve of a housing that includes alginate particles.

In an embodiment, alginate particles may be packed in a housing that is designed to retain the particles. A feed stream comprising one or more metal compounds may be processed by the alginate particles in the housing. The concentration of metal compounds may be reduced in the effluent from the housing. FIG. 6 depicts a representation of a graph of the concentrations of cadmium, chromium, copper, nickel, lead, and zinc in the effluent from an embodiment of the system. As depicted in FIG. 6, a concentration of metal ions in the effluent may decrease quickly. In an embodiment, certain metals, such as zinc, may leach out of the alginate particles after a period of time. The alginate particles may be able to continue to remove zinc from a feed stream after leaching zinc from the alginate particles. FIG. 7 depicts a representation of a graph of sodium and calcium concentrations in the same effluent represented in FIG. 6. Calcium and sodium may be present in the effluent, as depicted in FIG. 7. In an embodiment, an amount of calcium in the effluent may be approximately steady. Sodium and/or calcium in the effluent may be from the alginate particles. As metal ions couple to the alginate and/or are retained by the alginate, sodium and/or calcium coupled to the alginate may pass into the fluid being processed by the alginate particles. FIG. 8 depicts an embodiment of a breakout curve for an embodiment of a system that includes alginate particles in a housing.

Figure 9A:
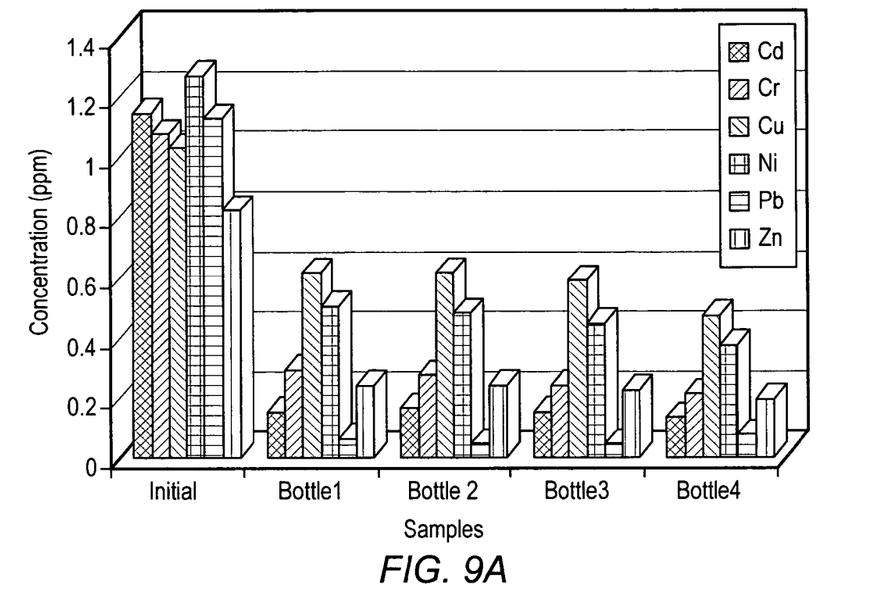
FIG. 9A depicts a representation of a graph of concentration of metal-organics in an effluent from an embodiment of a system.
Figure 9B:
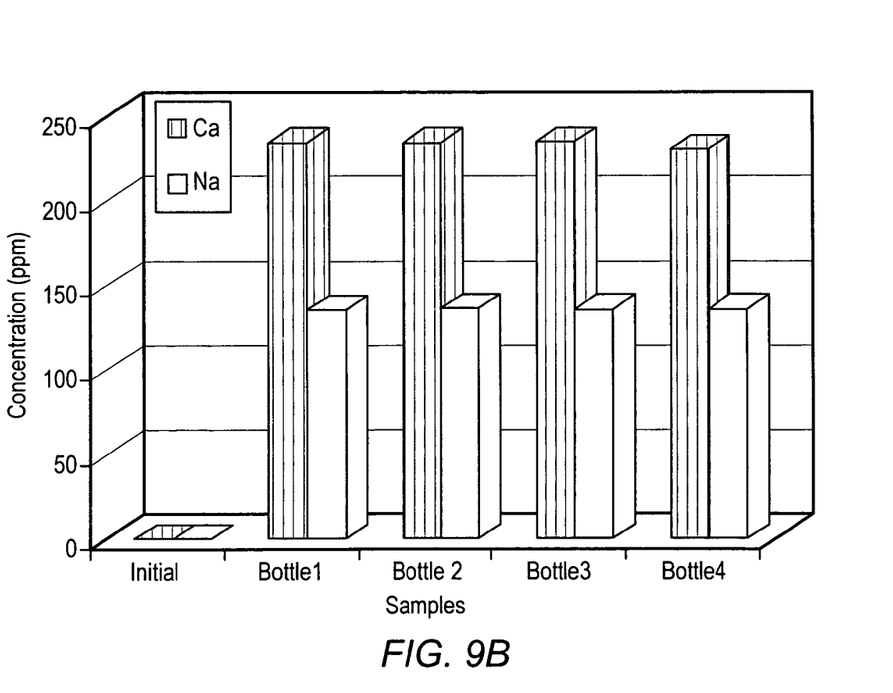
FIG. 9B depicts a representation of a graph of concentration of sodium and calcium ions in the effluent of FIG. 9A.

In certain embodiments, alginate beads may also be capable of removing metal-organics from a feed stream. FIG. 9A depicts a representation of a graph of metal organic concentrations in an effluent, from an embodiment of a system. FIG. 9B depicts a representation of a graph of sodium and alginate concentrations in the effluent of FIG. 9A. FIG. 9A shows that the alginate particles may remove metal organics. Sodium and calcium may be present in the effluent. Since sodium and calcium are present in the effluent, in certain embodiments, metal and the metal organics may be ion exchanged with the sodium or calcium present in the alginate beads.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a sieve" includes a combination of two or more sieves and reference to "alginate" includes mixtures of alginates.

Certain materials (e.g., articles) have been incorporated by reference. The text of such materials is, however, only incorporated by reference to the extent that no conflict exists between such text and the other statements and drawings set forth herein. In the event of such conflict, then any such conflicting text in such incorporated by reference materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

EXAMPLES

Example 1

Sodium alginate granules were sifted through a #20 ASTM sieve. The sodium alginate granules that passed through the #20 ASTM sieve were then sifted through a #25 ASTM sieve. An aqueous solution containing 2 wt % available calcium was prepared from water and calcium chloride. Sifted sodium alginate granules (5 g) were added to an aqueous solution (100 ml) containing calcium ions. The aqueous solution was stirred for 5-10 minutes and alginate particles formed. The aqueous solution was filtered through no. 40 filter paper (8 μm pore diameter). The alginate particles retained on the filter paper were dried at 30° C. for 24 hours.

Figure 10:
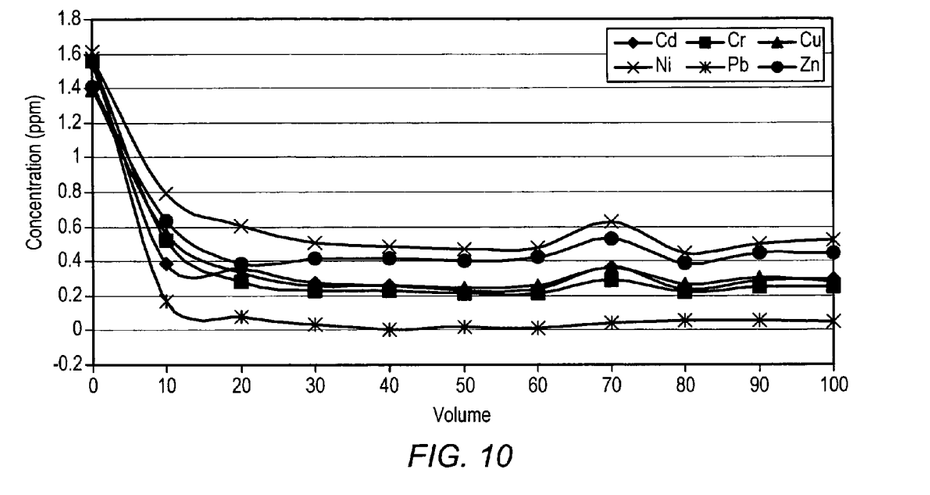
FIG. 10 depicts a graph of concentration of metal ion in the effluent produced in Example 1.

A housing designed to retain the alginate particles was prepared. Sodium alginate particles were placed in the prepared housing and feed streams containing metal ions were processed through the housing. FIG. 10 depicts the concentration of metal ions in the effluent. As shown in FIG. 10, the alginate particles significantly reduced the amount of cadmium, chromium, copper, lead, and zinc in the effluent.

Example 2

Sodium alginate granules were sifted through a #20 ASTM sieve. The sodium alginate granules that passed through the #20 ASTM sieve were then sifted through a #25 ASTM sieve. An aqueous solution containing 2 wt % available calcium was prepared from water and calcium chloride. Sifted sodium alginate granules (6 g) were added to an aqueous solution (100 ml) containing calcium ions. The aqueous solution was stirred for 5-10 minutes and alginate particles formed. The aqueous solution was filtered through no. 40 filter paper (8 μm pore diameter). The alginate particles retained on the filter paper were dried at 30° C. for 24 hours.

Figure 11:
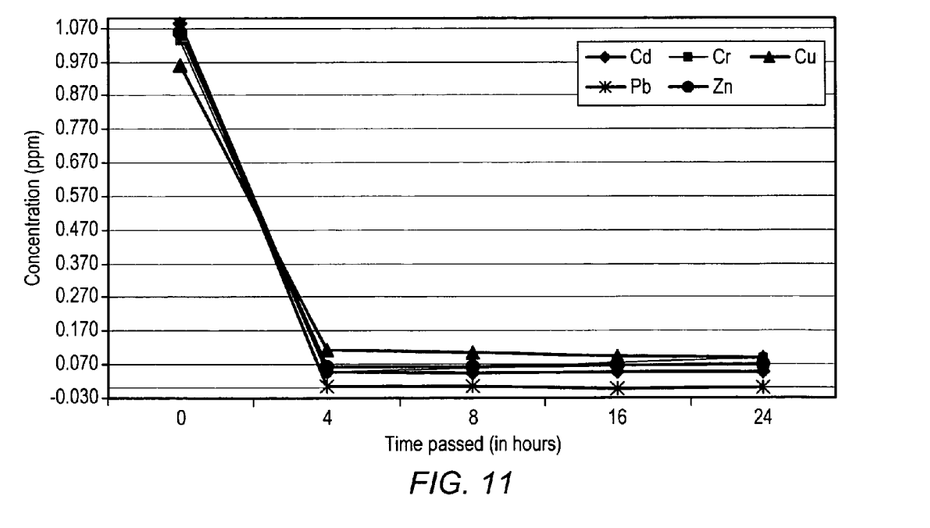
FIG. 11 depicts a graph of concentration of metal ion in the effluent produced in Example 2.

A housing designed to retain the alginate particles was prepared. Sodium alginate particles were placed in the prepared housing and feed streams containing metal ions were processed through the housing. FIG. 11 depicts the concentration of metal ions in the effluent. As shown in FIG. 11, the alginate particles significantly reduced the amount of cadmium, chromium, copper, nickel, lead, and zinc in effluent.

Example 3

Sodium alginate granules were sifted through a #20 ASTM sieve. The sodium alginate granules that passed through the #20 ASTM sieve were then sifted through a #25 ASTM sieve. An aqueous solution containing 2 wt % available calcium was prepared from water and calcium chloride. Sifted sodium alginate granules (10 g) were added to an aqueous solution (100 ml) containing calcium ions. The aqueous solution was stirred for 5-10 minutes and alginate particles formed. The aqueous solution was filtered through no. 40 filter paper (8 μm pore diameter). The alginate particles retained on the filter paper were dried at 30° C. for 24 hours.

Figure 12:
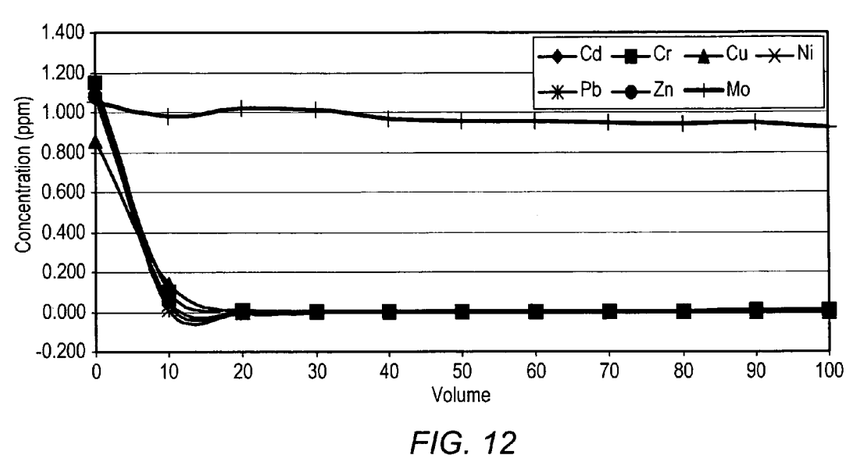
FIG. 12 depicts a graph of concentration of metal ion in the effluent produced in Example 3.

A housing designed to retain the alginate particles was prepared. Sodium alginate particles were placed in the prepared housing and feed streams containing metal ions were processed through the housing. FIG. 12 depicts the concentration of metal ions in the effluent. As shown in FIG. 12, the alginate particles significantly reduced the amount of cadmium, chromium, copper, nickel, lead, and zinc in the effluent. The sodium alginate particles were also capable of removing some molybdenum from the feed stream.

Example 4

Sodium alginate granules were sifted through a #20 ASTM sieve. The sodium alginate granules that passed through the #20 ASTM sieve were then sifted through a #25 ASTM sieve. An aqueous solution containing 2 wt % available calcium was prepared from water and calcium chloride. Sifted sodium alginate granules (15 g) were added to an aqueous solution (100 ml) containing calcium ions. The aqueous solution was stirred for 5-10 minutes and alginate particles formed. The aqueous solution was filtered through no. 40 filter paper (8 μm pore diameter). The alginate particles retained on the filter paper were dried at 30° C. for 24 hours.

Figure 13:
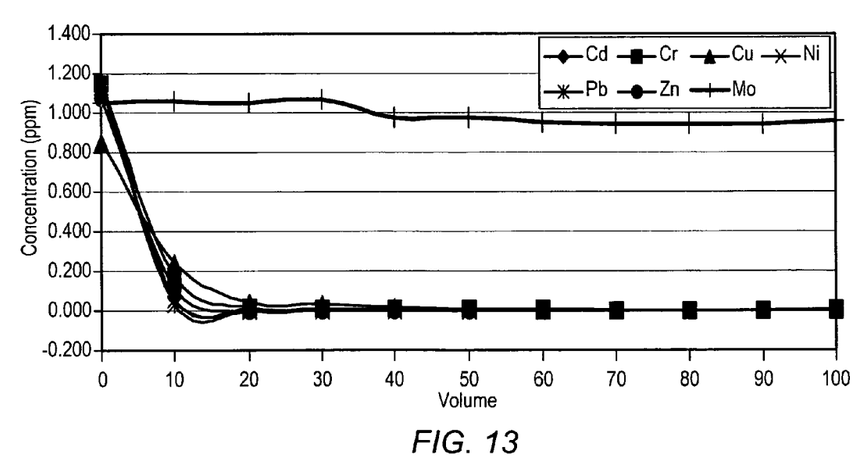
FIG. 13 depicts a graph of concentration of metal ion in the effluent produced in Example 4.

A housing designed to retain the alginate particles was prepared. Sodium alginate particles were placed in the prepared housing and feed streams containing metal ions were processed through the housing. FIG. 13 depicts the concentration of metal ions in the effluent. As shown in FIG. 13, the alginate particles significantly reduced the amount of cadmium, chromium, copper, nickel, lead, and zinc in the effluent. The sodium alginate particles were also capable of removing some molybdenum from the feed stream.

What is claimed is:

1. A method comprising:
    obtaining alginate granules having a width of less than 1 mm;
    introducing the obtained alginate granules directly into an aqueous solution comprising metal ions;
    allowing alginate particles to form in the aqueous solution.
2. The method of claim 1, wherein the alginate granules comprise sodium alginate, barium alginate, or a combinations thereof.
3. The method of claim 1, wherein the aqueous solution comprises calcium ions, barium ions, zinc ions, copper ions, or combinations thereof.
4. The method of claim 1, further comprising preparing the aqueous solution comprising metal ions.
5. The method of claim 4, wherein preparing the aqueous solution comprises adding limestone, calcium chloride, dicalcium phosphate, or combinations thereof to an aqueous solution.
6. The method of claim 1, wherein obtaining the alginate granules comprises sifting alginate granules.
7. The method of claim 6, wherein sifting comprises passing at least a portion of the alginate granules through a sieve, and wherein the particles that pass through or are retained on the sieve are directly added to the aqueous solution comprising metal ions.
8. The method of claim 1, further comprising drying the alginate particles.
9. The method of claim 1, wherein the alginate particles are capable of removing heavy metals from a fluid.

10. A method comprising:
obtaining alginate granules having a width of less than 1 mm;
adding an aqueous solution comprising metal ions to a housing;
adding the obtained alginate granules directly into the aqueous solution in the housing;
allowing alginate particles to form; and
removing the aqueous solution from the housing.

11. The method of claim 10, further comprising washing the alginate particles with water.

12. The method of claim 10, wherein the alginate particles are positioned proximate one or more filters and/or one or more fillers in the housing.

13. The method of claim 10, further comprising forming alginate particles with a width less than 5 μm in the aqueous solution.

14. The method of claim 10, wherein obtaining the alginate granules comprises sifting alginate granules.

15. The method of claim 10, further comprising agitating the aqueous solution comprising metal ions after and/or during introduction of the alginate granules.

16. The method of claim 10, wherein the alginate particles are capable of removing metals from a fluid.

17. A method comprising:
providing alginate particles having a width of less than 1 mm in a housing, wherein the alginate particles are formed by adding alginate granules directly into an aqueous solution comprising metal ions;
allowing a fluid comprising metal ions to flow into the housing;
contacting at least a portion of the fluid with the alginate particles;
allowing the alginate particles to reduce an amount of metal in the fluid.

18. The method of claim 17, wherein the fluid comprises drinking water, municipal wastewater, or industrial wastewater.

19. The method of claim 17, wherein the fluid comprises one or more heavy metals.

20. The method of claim 17, further comprising passing a regenerative solution through the housing.

* * * * *